United States Patent
Belzile et al.

(10) Patent No.: US 8,453,775 B2
(45) Date of Patent: Jun. 4, 2013

(54) OFF-ROAD VEHICLE HAVING A COOLING TUNNEL

(75) Inventors: David Belzile, Granby (CA); Claude Gagnon, Magog (CA); Stephane Sanschagrin, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 368 days.

(21) Appl. No.: 12/863,113

(22) PCT Filed: Jan. 31, 2008

(86) PCT No.: PCT/US2008/052650
§ 371 (c)(1),
(2), (4) Date: Dec. 3, 2010

(87) PCT Pub. No.: WO2009/096977
PCT Pub. Date: Aug. 6, 2009

(65) Prior Publication Data
US 2011/0209937 A1 Sep. 1, 2011

(51) Int. Cl.
*B60K 11/06* (2006.01)
*B60K 5/00* (2006.01)
*B62D 25/20* (2006.01)

(52) U.S. Cl.
USPC .......... 180/68.1; 180/291; 180/292; 180/69.1

(58) Field of Classification Search
USPC .............. 180/68.1, 68.2, 68.4, 69.1, 291, 292
See application file for complete search history.

(56) References Cited

U.S. PATENT DOCUMENTS

| | | | | |
|---|---|---|---|---|
| 2,612,964 | A * | 10/1952 | Hobbs | 180/312 |
| 4,655,307 | A * | 4/1987 | Lamoureux | 180/69.1 |
| 5,490,572 | A * | 2/1996 | Tajiri et al. | 180/65.1 |
| 5,813,491 | A * | 9/1998 | Sato et al. | 180/309 |
| 6,920,949 | B2 | 7/2005 | Matsuura et al. | |
| 7,168,516 | B2 * | 1/2007 | Nozaki et al. | 180/68.3 |

(Continued)

FOREIGN PATENT DOCUMENTS

| CN | 2771091 Y | 4/2006 |
|---|---|---|
| CN | 1803518 A | 7/2006 |

(Continued)

OTHER PUBLICATIONS

English abstract of CN 2771091Y, retrieved from Espacenet on Oct. 17, 2012.

(Continued)

*Primary Examiner* — John R Olszewski
(74) *Attorney, Agent, or Firm* — BCF LLP (57) ABSTRACT

An off-road vehicle is disclosed having a frame (32), at least four wheels (36, 38) suspended from the frame (32), a left seat (40B), a right seat (40A), an engine (48) mounted to a middle portion (62) of the frame (32), and a console (70) mounted on the middle portion of the frame (62) laterally between the left seat (40B) and the right seat (40B). The console (70) covers the upper portion of the engine (48) and defines a central cooling tunnel (88) extending forwardly and rearwardly of the engine (48) which tunnels air flow around the engine (48) for cooling the later. The off-road vehicle also features a passageway in front of the central cooling tunnel, and a fan aligned with the passageway to increase air flow through the central cooling tunnel (70) when required.

20 Claims, 8 Drawing Sheets

U.S. PATENT DOCUMENTS

| | | | |
|---|---|---|---|
| 7,438,147 B2 | 10/2008 | Kato et al. | |
| 7,690,472 B2* | 4/2010 | Kato et al. | 180/291 |
| 8,074,756 B2* | 12/2011 | Kusaka et al. | 180/68.3 |
| 8,256,561 B2* | 9/2012 | Mochizuki et al. | 180/291 |
| 2001/0023788 A1* | 9/2001 | Inagaki et al. | 180/197 |
| 2004/0216942 A1* | 11/2004 | Tanaka et al. | 180/292 |
| 2005/0150706 A1* | 7/2005 | Eguchi et al. | 180/291 |
| 2006/0278451 A1* | 12/2006 | Takahashi et al. | 180/68.1 |
| 2007/0261906 A1* | 11/2007 | Yao et al. | 180/292 |
| 2011/0073403 A1* | 3/2011 | Bennett et al. | 180/292 |

FOREIGN PATENT DOCUMENTS

| | | |
|---|---|---|
| EP | 1864844 A1 | 12/2007 |
| GB | 165485 A | 7/1921 |
| GB | 905672 A | 9/1962 |
| RU | 18785 U1 | 7/2001 |
| RU | 2181847 C1 | 4/2002 |

OTHER PUBLICATIONS

English abstract of CN 1803518A, retrieved from Espacenet on Oct. 17, 2012.

International Search Report of PCT/US2008/052650, Nov. 6, 2008, Volker Lindner.

English abstract of RU 2181847; retrieved from Espacenet on Feb. 6, 2012.

\* cited by examiner

OFF-ROAD VEHICLE HAVING A COOLING TUNNEL

FIELD OF THE INVENTION

The present invention relates to off-road vehicles, and more specifically to an off-road vehicle having a cooling tunnel.

BACKGROUND OF THE INVENTION

Recreational utility vehicles (RUVs) generally have an open passenger cabin with side-by-side seating. They are often referred to as side-by-side All-Terrain Vehicles (ATVs) which typically have single straddle-type seats. The engine in an RUV is typically placed between the side-by-side seats leaving room at the front and back of the RUV for cargo space or other utility functions. These vehicles generally have a step-through design which means that the area in front of the seats is open across the width of the vehicle an occupant can easily step across from one seat to the other. The engine is typically installed in an engine bay which protects the engine and is covered by a plastic cowling isolating the engine from the passengers. The engine is therefore not exposed to the environment but it is also not exposed to any air flow, and therefore the engine may experience overheating and the components or the cowling surrounding the engine may get hot and malfunction or melt if not designed to resist heat build-up.

Manufacturers have typically designed these vehicles with large radiator and fan systems to cool the enclosed engine. However, large radiator and fan systems generally increase the size and weight of the vehicle.

Therefore, there is a need for an off-road vehicle having a construction which addresses at least some of these inconveniences.

SUMMARY OF THE INVENTION

It is an object of the present invention to ameliorate at least some of the inconveniences present in the prior art.

It is also an object of the present invention to provide an off-road vehicle having a central cooling tunnel.

It is another object of the present invention to provide an off-road vehicle having a console defining a central cooling tunnel for cooling the engine.

In one aspect, the invention provides an off-road vehicle having a frame having a front portion, a middle portion and a rear portion; at least four wheels suspended from the frame, each of the at least four wheels including a tire; a left seat and a right seat, both mounted on the middle portion of the frame; a steering assembly disposed forwardly of one of the seats and being operatively connected to at least two of the at least four wheels; an engine mounted to the middle portion of the frame and being operatively connected to at least two of the at least four wheels, the engine having upper portion and a lower portion; a console mounted on the middle portion of the frame laterally between the left seat and the right seat, the console covering at least the upper portion of the engine and separating the engine from the left and right seats, the console having an outer side and an inner side, the inner side of the console defining a central cooling tunnel extending forwardly and rearwardly of the engine; the central cooling tunnel housing at least the upper portion of the engine and including a frontal opening and a rear opening allowing air flow through the central cooling tunnel from the frontal opening the rear opening, and around at least the upper portion of the engine.

In an additional aspect, the central cooling tunnel extends from the front portion of the frame to the rear portion of the frame.

In another aspect the off-road vehicle comprises a passageway in front of the central cooling tunnel, and a fan aligned with the passageway, the fan being adapted to increase air flow through the central cooling tunnel when required.

In a further aspect, the surface area of the frontal opening is substantially equal to the surface area of an average cross-section of the central cooling tunnel.

In a further aspect, the surface area of the rear opening is substantially equal to the surface area of an average cross-section of the central cooling tunnel.

In a further aspect, the off-road vehicle comprises a left floor panel underneath the left seat and a right floor panel underneath the right seat, the console including a top portion and a pair of side walls extending downwardly from the top portion, the side walls extending to the left and right floor panels.

In another aspect, the off-road vehicle of claim comprises a dashboard forward of the seats having a central section, the top portion of the console extending to the central section of the dashboard.

In a further aspect, the left and right floor panels each include a front panel rising in front of the left and right seats to reach a bottom portion of the dashboard, the front panels extending to the side walls of the console.

In an additional aspect, the floor panels and the dashboard define at least in part a driver and passenger area isolated from the ground.

In a further aspect, the console further comprises at least one access panel to access the engine.

In an additional aspect, the console comprises at least one heat trap for allowing heat from the engine to reach one of the seats.

In an additional aspect, the driver and passenger area further comprises a tubular cage disposed around the left and right seat.

In another aspect, the middle portion of the frame further comprises a structural cross-member generally positioned underneath the console and connecting the rear portion of the frame to the front portion of the frame.

In a further aspect, the central cooling tunnel further comprises a lower portion, the lower portion of the central cooling tunnel being closed by a skid plate.

In another aspect, the invention provides an off-road vehicle comprising: a frame; at least four wheels suspended from the frame, each of the at least four wheels including a tire; a driver and passenger area having a left seat and a right seat mounted on the frame, floor panels including front panels extending under the left and right seats, and a dashboard disposed in front of the left and right seats, the driver and passenger area extending from the rearmost portion of the left and right seats to the front panels; a steering assembly disposed in the driver and passenger area forwardly of one of the seats and being operatively connected to at least two of the at least four wheels; an engine mounted to the frame and being operatively connected to at least two of the at least four wheels, the engine having an upper portion and a lower portion; a console mounted on the frame laterally between the left seat and the right seat, the console covering at least the upper portion of the engine and separating the engine from the driver and passenger area, the console having an outer side and an inner side, the inner side of the console defining a central cooling tunnel extending a majority of the length of the driver and passenger area; the central cooling tunnel housing at least the upper portion of the engine and including a frontal opening and a rear opening allowing air flow through the central cooling tunnel.

In an additional aspect, the central cooling tunnel is at least partially in the driver and passenger area.

In a further aspect, the console comprises at least one heat trap for allowing heat into the driver and passenger area.

For purposes of this application the term "off-road vehicle" refers to a vehicle which is typically used off paved surfaces such as a recreational utility vehicle (RUV) or an all-terrain vehicle (ATV). It should be understood that off-road vehicles could be used on paved surfaces, however they are specifically designed for off paved surfaces riding. An ATV refers to a wheeled vehicle designed for off-road use that travels on low pressure tires and has straddle seat. An RUV refers to an "opened" wheeled vehicle (contrary to a pickup truck which is a "closed" vehicle due to its closed passenger cabin) designed for off-road use which usually has side-by-side seating. Also, terms related to spatial orientation such as forwardly, rearwardly, frontal, rear, upper and lower, left, and right, are as they would normally be understood by a driver of the vehicle sitting thereon in a normal driving position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

The present invention will be described with respect to a recreational utility vehicle (RUV). However it should be understood that the present invention could be used on other types of off-road vehicles having an engine centrally located, such as turf vehicles for example.

Figure 1:
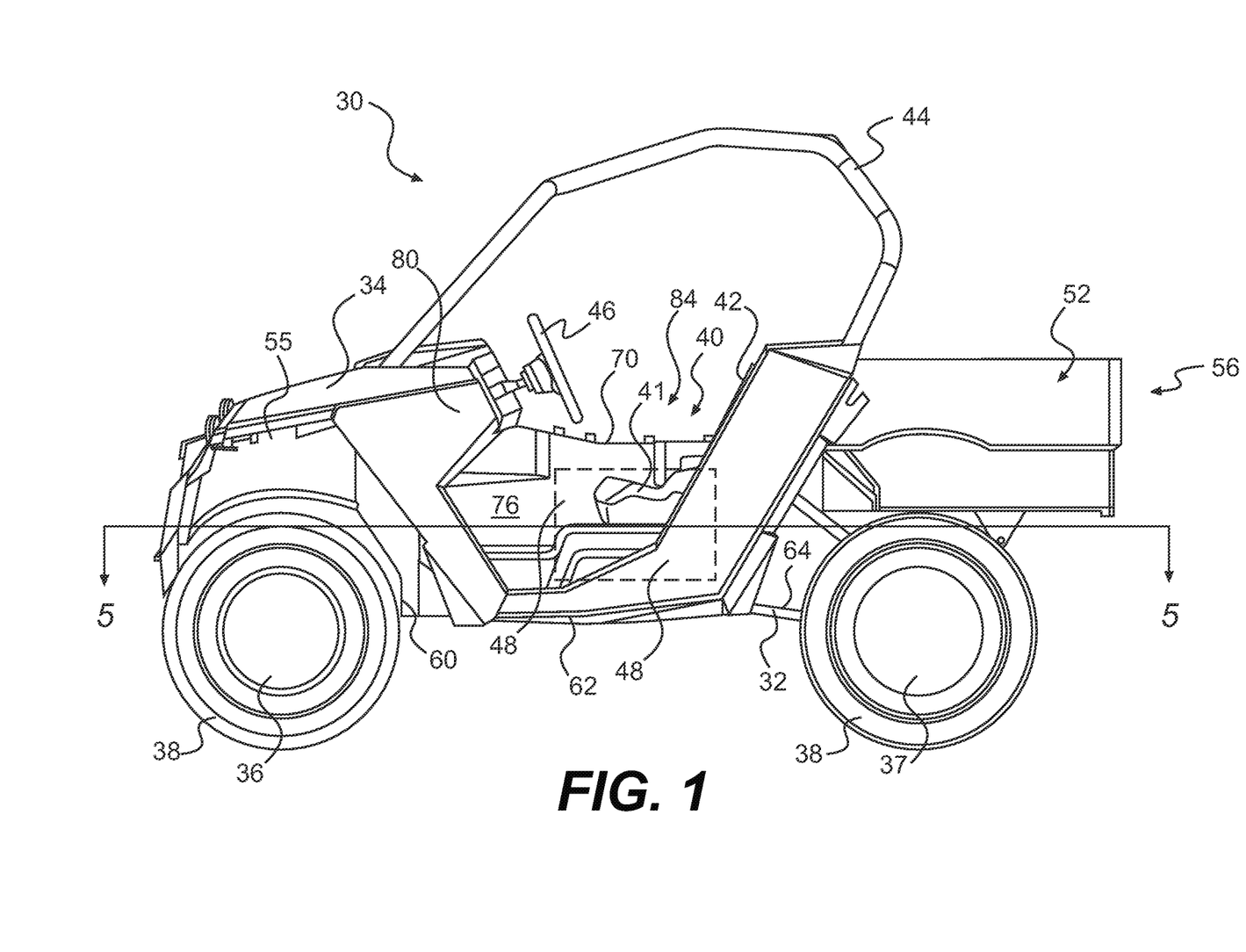
FIG. 1 is a left side elevation view of a recreational utility vehicle (RUV) in accordance with aspects of the present invention.
Figure 2:
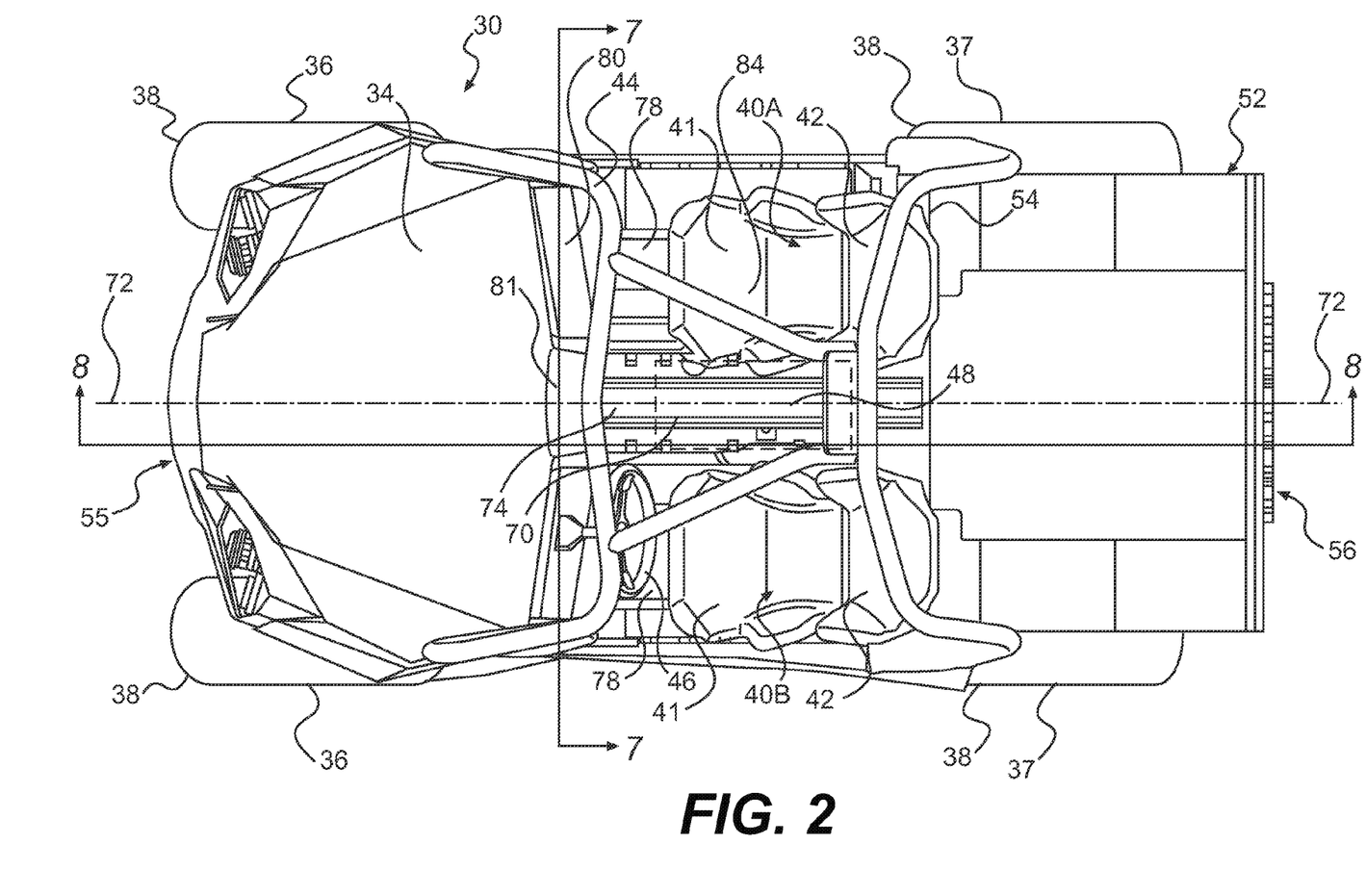
FIG. 2 is a top view of the RUV shown in FIG. 1.

FIGS. 1 and 2 illustrate an RUV 30. The RUV 30 has a front end 55, a rear end 56 and a driver and passenger area 84. The RUV 30 includes a frame 32 to which a vehicle body 34 is mounted. The frame 32 includes front portion 60, a middle portion 62 and a rear portion 64 best shown in FIG. 4 A pair of front wheels 36 is suspended from the front portion 60 of the frame 32 via front suspension elements (not shown). A pair of rear wheels 37 is suspended from the rear portion 60 of the frame 32 via rear suspension elements (not shown). Each of the four wheels 36, 37 has a tire 38. It is contemplated that the RUV 30 could have six or more wheels. As best seen in FIG. 2, a right seat 40A and a left seat 40B, each having a seat base 41 and a backrest 42, are mounted laterally beside each other on the middle portion 62 of the frame 32 in the driver and passenger area 84 to accommodate a driver and a passenger of the RUV 30. A tubular cage 44 is connected to the frame 32 and is disposed around the driver and passenger area 84. A steering assembly including a steering wheel 46 is disposed in front of the left seat 40B. The steering wheel 46 could be disposed in front of the right seat 40A. The steering assembly is operatively connected to the two front wheels 36 to permit steering of the RUV 30. An engine 48, shown schematically in dotted lines, is mounted to the middle portion 62 of frame 32 between the right seat 40A and the left seat 40B. The engine 48 is operatively connected to the four wheels 36, 37 to power the RUV 30. It is contemplated that the engine 48 could be operatively connected only to the front wheels 36 or only to the rear wheels 37. A cargo box 52 is pivotally mounted to the frame 32 rearwardly of the seats 40A and 40B. A console 70 positioned between the right seat 40A and the left seat 40B extends along the longitudinal axis 72 of the RUV 30 and covers and separates the engine 48 from the driver and the passenger. The console 70 has an upper portion 74 and a pair of side walls 76 extending downwardly from each side of the upper portion 74 of the console 70.

The RUV 30 has other features and components such as headlights and handles. As it is believed that these features and components would be readily recognized by one of ordinary skill in the art, further explanation and description of these components will not be provided herein.

Figure 3:
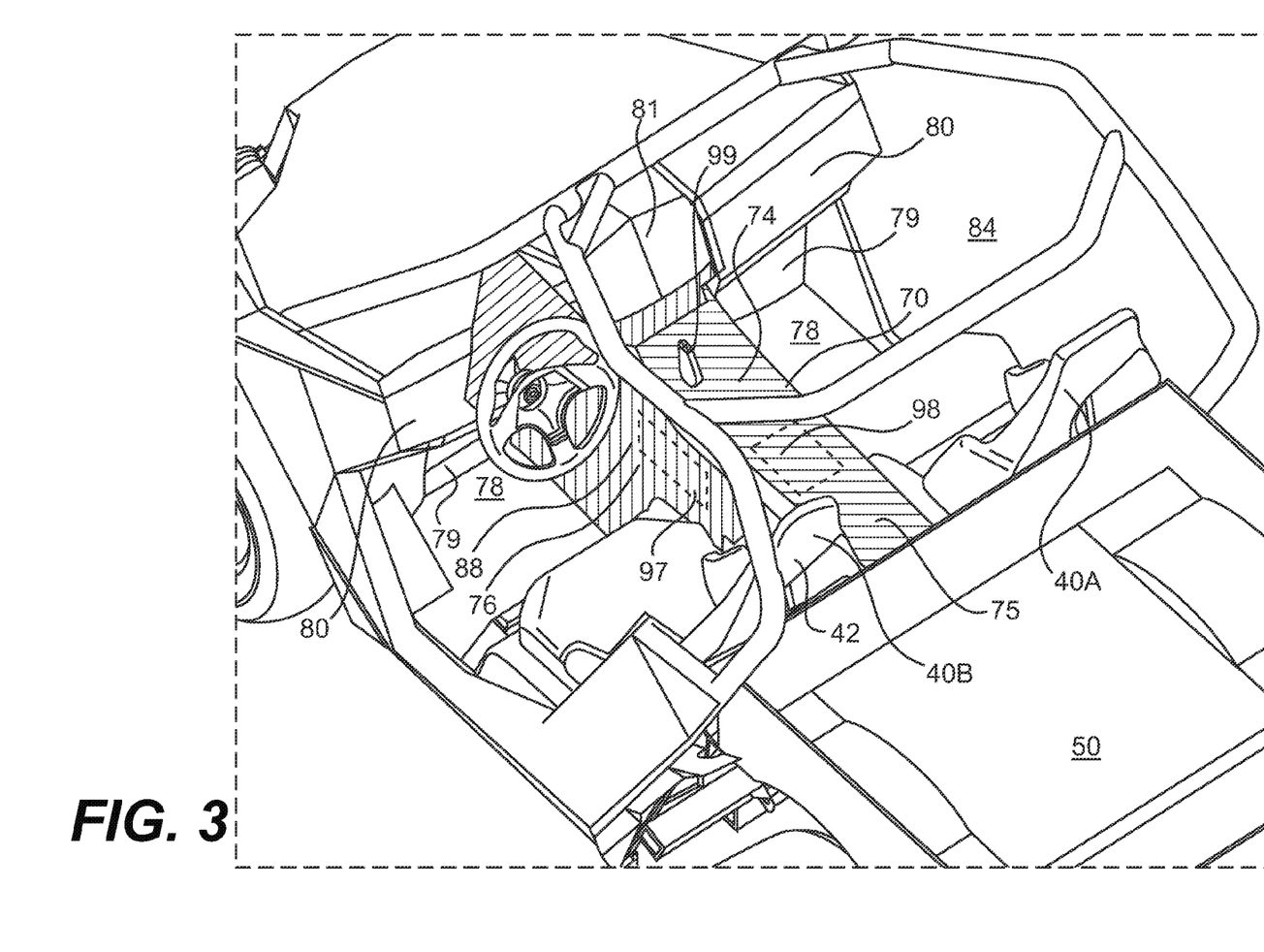
FIG. 3 is a partial perspective view, taken from a rear, left side of the RUV shown in FIG. 1.

Referring now to FIG. 3, the upper portion 74 of the console 70 extends forwardly and reaches the central section 81 of the dashboard 80 mounted on the front portion 60 of the frame 32 in front of the right and left seats 40A and 40B. The side walls 76 of the console 70 extend down to the floor panels 78 located below the seats 40A and 40B. The floor panels 78 each include a front panel 79 rising in front of the right and left seats 40A and 40B to reach the bottom portion of the dashboard 80. The side walls 76 of the console 70 also extend forwardly to reach the front panels 79 and the bottom portion of the dashboard 80. The floor panels 78 including the front panels 79, and the dashboard 80 define the driver and passenger area 84 and effectively separate the driver and passenger from the ground and from the front end 55 of the RUV 30. The driver and passenger area 84 extends from the back of the backrests 42 of the right and left seats 40A and 40B to the front panels 79 of the floor panels 78. Since the engine 48 is positioned centrally in the RUV 30, the console 70 acts as an engine cover. The console 70 creates a sound barrier between the driver and passenger and the engine 48. The console 70 is also used to support standard features such as a gear shift stick 99, various control buttons, cup holders, etc. The outer side 75 of the console 70 is designed to be aesthetically pleasing and blends with the design of the dashboard 80 of the driver and passenger area 84. The console 70 also hides several mechanical and electrical components connected to the engine 48 such as exhaust pipes, cooling hoses, electrical wires and some structural members.

The console 70 is preferably made of a one-piece plastic moulding, however the console 70 can be made of bent sheet metal or other materials. The console 70 can also be made of two or more pieces fastened, welded, glued, or otherwise connected together. The console 70 is provided with an access panel 98 to gain access to the oil dip stick or to the spark plugs of the engine 48. The console 70 is also provided with heat traps 97 on each side walls 76 which can be opened to let heat from the engine 48 into the driver and passenger area 84 and warm the driver and passenger in cold conditions.

Figure 4:
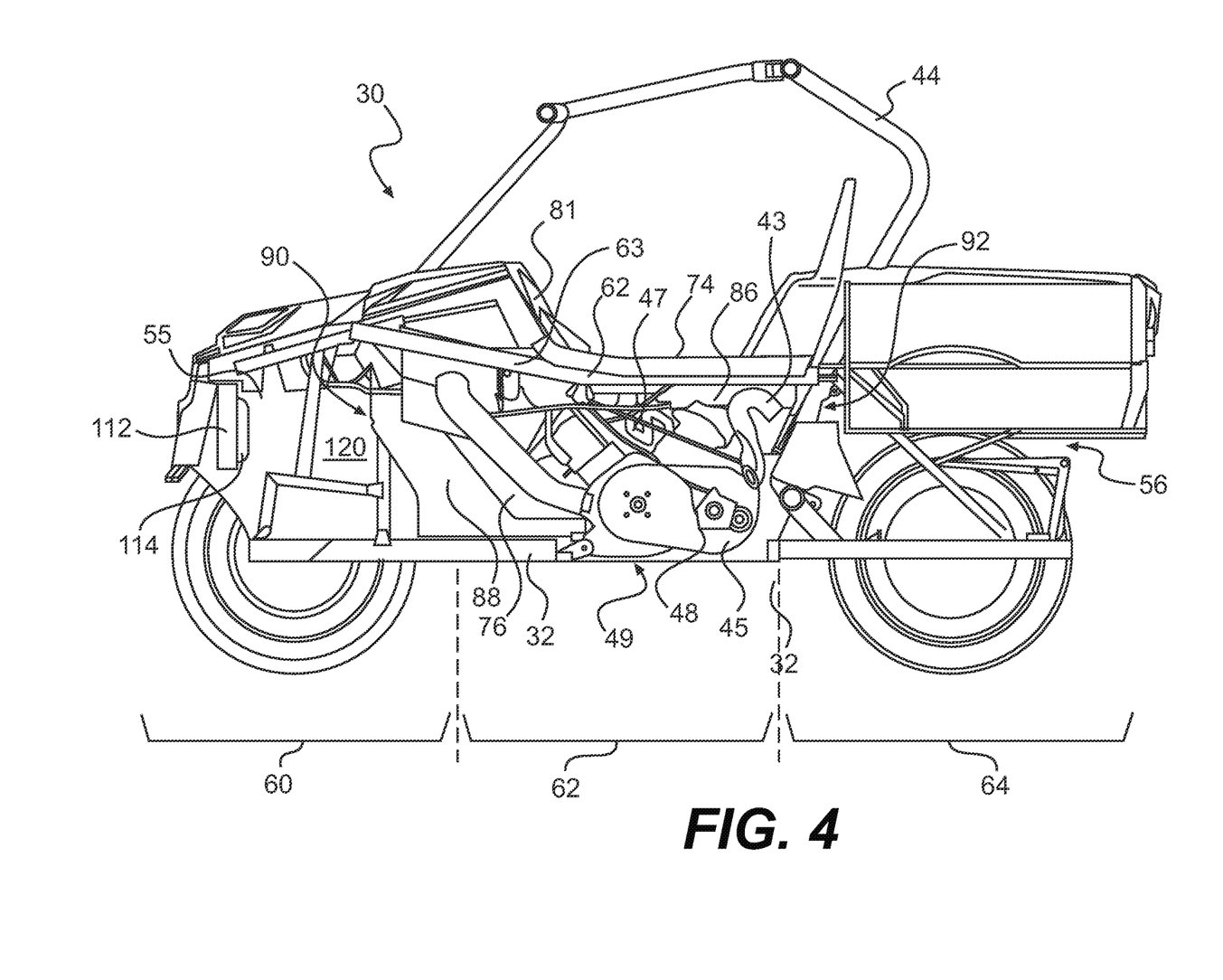
FIG. 4 is a cross-sectional view of the RUV taken along line 8-8 of FIG. 2.

Referring now to FIG. 4, which is a cross-section of the RUV 30 taken along line 8-8 of FIG. 2, it can be seen that the engine 48 is mounted centrally to the middle portion 62 of the frame 32. The middle portion 62 of the frame 32 includes a cross-member 63 that connects the front portion 60 of the frame 32 to the rear portion of the frame 32 thereby rigidifying the structure of the frame 32. The upper portion 74 of the console 70 is positioned directly above the cross-member 63 such that the cross-member 63 is hidden from view. The engine 48 has an upper portion 47 and a lower portion 47. The engine 48 includes an integrated continuously variable transmission (CVT) 45 that transmit motive force from the engine 48 to the wheels. The engine 48 also includes a CVT exhaust conduit 43. As illustrated, the upper portion 74 of the console 70 extends above the upper portion 47 of the engine 48 and the side walls 76 circumscribe both sides of the engine 48. The upper portion 74 of the console 70 and the side walls 76 of the console 70 together cover the engine 48 and define a central cooling tunnel 88 extending at least forwardly and rearwardly of the engine 48 thereby allowing air to flow from the front end 55 of the RUV 30 to the rear end 56 of the RUV 30 to cool the engine 48. The central cooling tunnel 88 preferably extends from the front portion 60 of the frame 32 to the rear portion 64 of the frame 32 and includes a frontal opening 90 connecting the central cooling tunnel 88 with the front end 55 of the RUV 30 and a rear opening 92 connecting the central cooling tunnel 88 with the rear end 56 of the RUV 30. Air flow may therefore circulate through the central cooling tunnel 88 in order to cool the engine 48 and its exhaust system (not shown) as well as the CVT 45 and the engine auxiliary components located within the central cooling tunnel 88.

Figure 5:
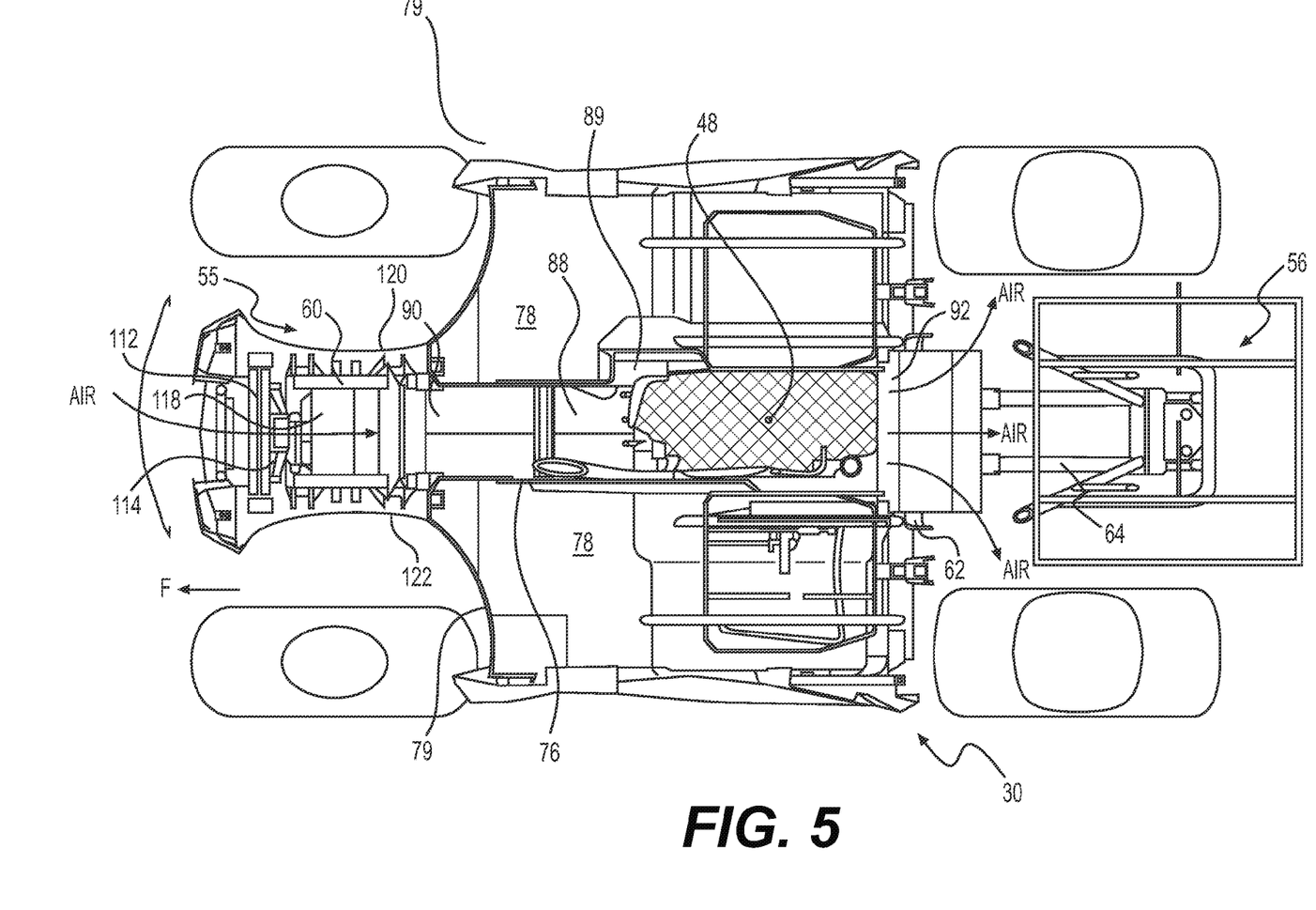
FIG. 5 is a cross-sectional view of the RUV taken at line 5-5 of FIG. 1.

The engine 48 is connected through hoses (not shown) to a radiator 112 located at the front end 55 of the RUV 30. The radiator 112 is equipped with an electric fan 114 to increase the air flow through the radiator 112 when required i.e. when the engine 48 reaches a predetermined temperature. As illustrated in FIG. 5, the radiator 112 and fan 114 are aligned with the central cooling tunnel 88. Air penetrating the radiator 112 is thereafter routed to the frontal opening 90 of the central cooling tunnel 88 through a passageway 118 defined by wheel panels 120 and 122. The wheel panels 120 and 122 extend from the front end 55 to the front panels 79 of the floor panels 78 and partially separate the passageway 118 and frontal opening 90 of the central cooling tunnel 88 from the front wheels 36 to prevent dirt, mud or debris from being thrown onto the radiator 112 and fan 114 and from entering the central cooling tunnel 88 through the frontal opening 90.

With reference to FIG. 5, which is a cross sectional view of the RUV 30 taken along line 5-5 of FIG. 1, when the RUV 30 is moving forward in the direction F, air enters through the front end 55 of the RUV 30 and partially through the radiator 112, flows through the passageway 118 to enter the frontal opening 90 and flows through the central cooling tunnel 88. Air flow circulates around the engine 48, the exhaust system and the CVT 45, removing heat from them while flowing through the central cooling tunnel 88 and exits through the rear opening 92 rejecting heat outside the central cooling tunnel 88 in the process. The passageway 118 and the central cooling tunnel 88 therefore define an air flow path which directs the air flow to the engine 48, the CVT 45 and the exhaust system of the engine.

As can be readily seen, the central cooling tunnel 88 extends from the front portion 60 of the frame 32 to the rear portion 64 of the frame 32 and is adapted to funnel air flow directly onto the engine 48, the exhaust system, and CVT 45. The central cooling tunnel 88 is adapted to circumscribe the engine 48 in order to maintain air flow around the engine 48. As shown in FIG. 5, the side walls 76 of the central cooling tunnel 88 includes a wider portion 89 to accommodate a wider portion of the engine 48, the exhaust system, and CVT 45. The profile of the central cooling tunnel 88 is therefore partially determined by contours of the engine 48, the exhaust system, and the CVT 45 mounted in the RUV 30. The central cooling tunnel 88 may include other wider portions 89 to accommodate other wider portions of the engine 48, the exhaust system, and CVT 45.

In operation, when the RUV 30 is not moving, the electric fan 114 of the radiator 112 increase the air flow through the radiator 112 and also forces air flow through the passageway 118 through the frontal opening 90 and through the central cooling tunnel 88 thereby insuring a minimum air flow to the engine 48 when the vehicle is stopped and the engine 48 reaches a predetermined temperature. Although the fan 114 is set to start when the engine 48 reaches a predetermined temperature, it may also be set to start when the RUV comes to a stop in order to maintain minimum air flow to the engine 48.

Figure 6:
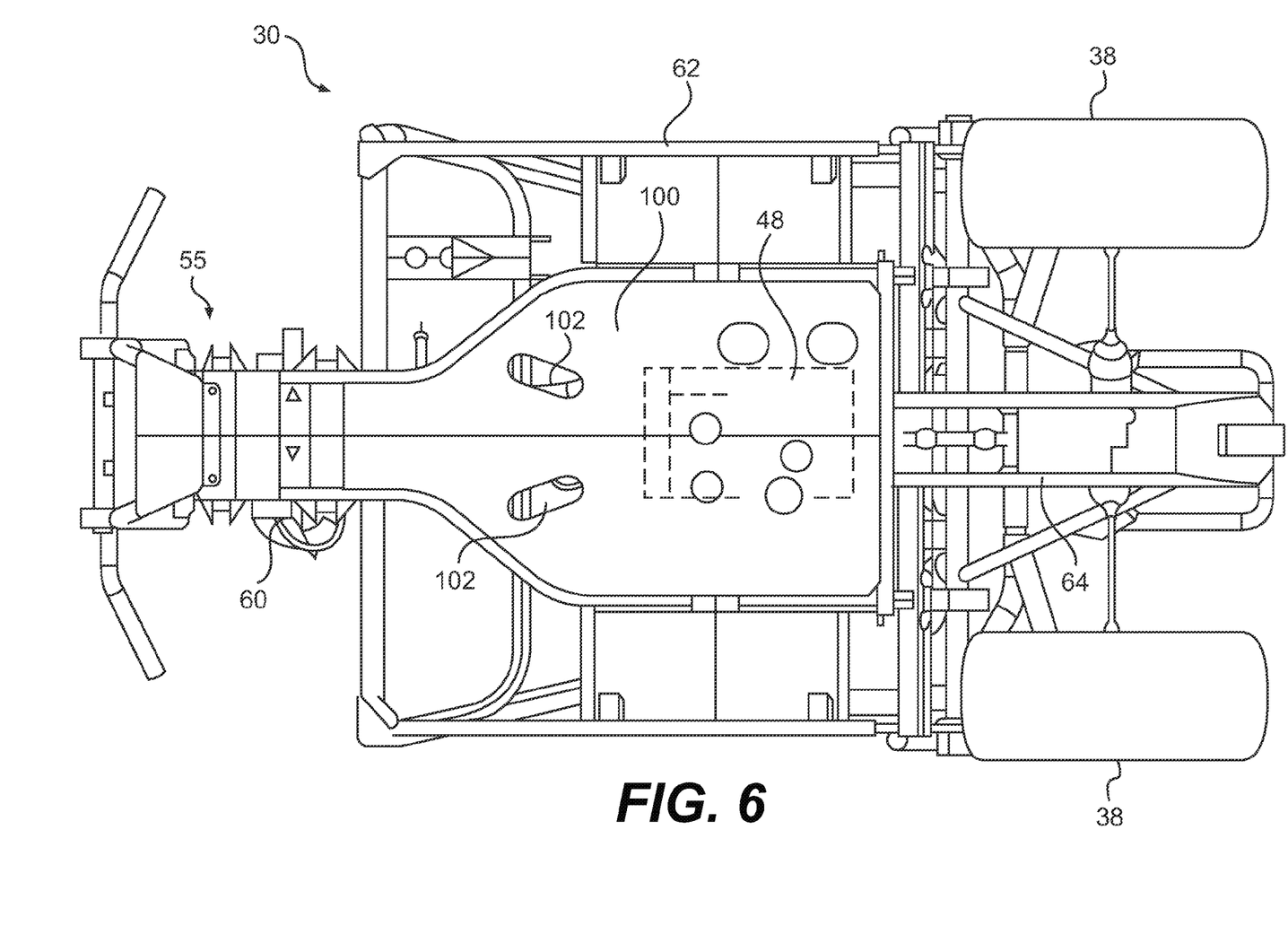
FIG. 6 is a bottom plan view of the RUV shown in FIG. 1.

Referring now to FIG. 6, which is a partial bottom plan view of the RUV 30, the lower portion of the central cooling tunnel 88 is closed by a skid plate 100 extending from the front portion 60 of the frame 32 to the rear portion 64 of the frame 32. The skid plate 100 enables air flow from the fan 114 (FIG. 5) to be directed into the central cooling tunnel 88. The skid plate 100 also isolates and protects the lower portion 47 of the engine 48 as wall as the CVT 45 from the ground and the environment. The skid plate 100 includes apertures 102 at the front of the skid plate 100 which allow air from under the RUV 30 to enter the central cooling tunnel 88 without directly exposing the engine 48 and the CVT 45 to the environment.

Figure 7:
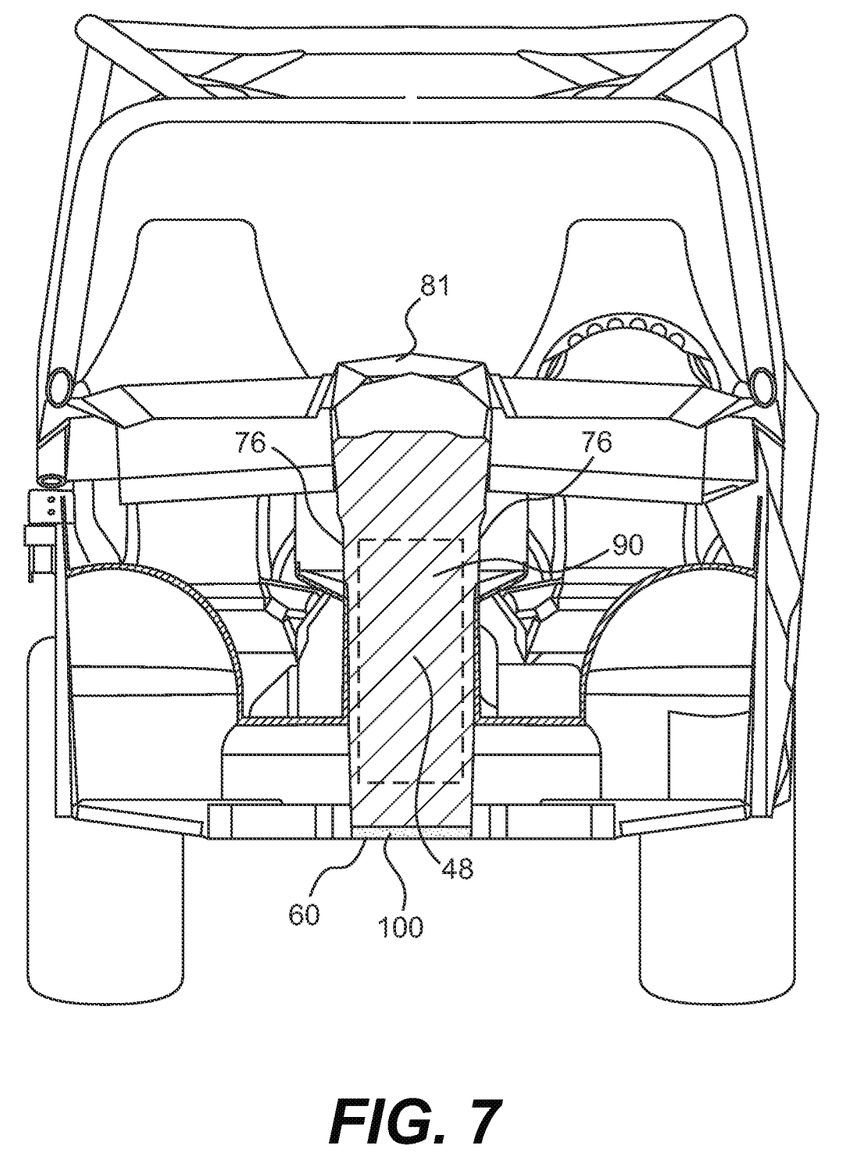
FIG. 7 is a cross-sectional view of the RUV taken along line 7-7 of FIG. 2.

Referring now to FIG. 7, which is a cross sectional view of the RUV 30 taken at line 7-7 of FIG. 2, the frontal opening 90 extends from the bottom of the front the skid plate 100 up to the central section 81 of the dashboard 80 thereby creating a frontal opening 90 which allows substantially unhindered ingress of air flow into the central cooling tunnel 88 and to the engine 48. The size of the frontal opening 90 provides improved air flow (i.e. less turbulence) through the central cooling tunnel 88 such that cooler air circulate around the engine 48. The designers are thus able to reduce the size and number of cooling elements necessary to prevent the engine 48 from overheating. The surface area of the frontal opening 90 therefore preferably extends a majority of the surface area of an average cross section of the central cooling tunnel 88 and more preferably is the same as the surface area of an average cross section of the central cooling tunnel 88 such that the air may flow through the central cooling tunnel 88 substantially unobstructed through the frontal opening 90. Similarly, the surface area of the rear opening 92 also extend a majority of the surface area of an average cross section of the central cooling tunnel 88 and more preferably is the same as the surface area of an average cross section of the central cooling tunnel 88 such that the air may exit the central cooling tunnel 88 substantially unrestricted thereby generating good air flow around the engine 48. The console 70 is an inverted U-shaped tunnel having no front end and no back end such that air flow enters and exits the central cooling tunnel 88 substantially unrestricted.

Figure 8:
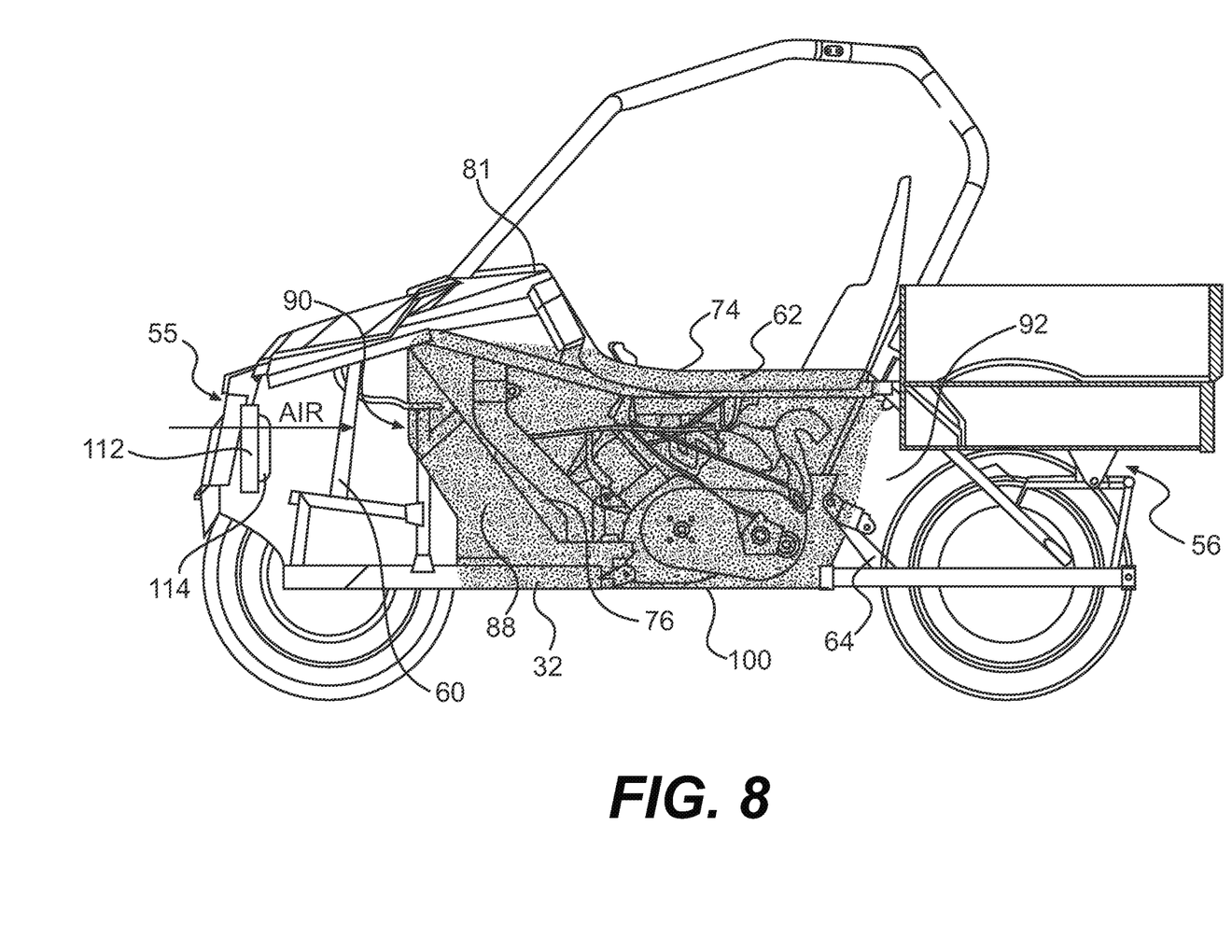
FIG. 8 is a cross-sectional view of the RUV taken along line 8-8 of FIG. 2.

Referring now to FIG. 8, the profile of the central cooling tunnel 88 is shaded to show the length and indirectly the volume occupied by the central cooling tunnel 88. The central cooling tunnel 88 extends the length of the driver and passenger area 84 from the front portion 60 of the frame 32 to the rear portion 64 of the frame 32 and from the skid plate 100 to the upper portion 74 of the console 70. The central cooling tunnel 88 is defined by the inner side of the console 70 and its bottom is closed by the skid plate 100. The roof of the central cooling tunnel 88 is circumscribed by the upper portion 74 of the console 70 and the walls of the central cooling tunnel 88 are circumscribed by the side walls 76 of the console 70.

As illustrated in FIGS. 7 and 8, the sides of the central cooling tunnel 88 are defined by the inner side of the side walls 76 of the console 70. Generally, the surface area of the frontal opening 90 or of the rear opening 92 is substantially the same or at least a majority of the surface area of an average cross section of the central cooling tunnel 88. The surface area of the frontal opening 90 or the rear opening 92 may also be larger than the average cross section of the central cooling tunnel 88 which could generate an accelerated air flow around the engine 48.

Referring back to FIG. 3, the central cooling tunnel 88 is illustrated in hatched lines. As illustrated, the central cooling tunnel 88 extends longitudinally between the right and left seat 40A and 40B from below the central section 81 of the dashboard 80, through the driver and passenger area 84 and all the way back to the cargo box 50 located at the rear end 56 of the RUV 30.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An off-road vehicle comprising:
    a frame having a front portion, a middle portion and a rear portion;
    at least four wheels suspended from the frame, each of the at least four wheels including a tire;
    a left seat and a right seat, both mounted on the middle portion of the frame;
    a steering assembly disposed forwardly of one of the seats and being operatively connected to at least two of the at least four wheels;
    an engine mounted to the middle portion of the frame and being operatively connected to at least two of the at least four wheels, the engine having upper portion and a lower portion;
    a console mounted on the middle portion of the frame laterally between the left seat and the right seat, the console covering at least the upper portion of the engine and separating the engine from the left and right seats, the console having an outer side and an inner side, the inner side of the console defining a central cooling tunnel extending forwardly and rearwardly of the engine;
    the central cooling tunnel housing at least the upper portion of the engine and including a frontal opening and a rear opening allowing air flow through the central cooling tunnel from the frontal opening to the rear opening, and around at least the upper portion of the engine.

2. The off-road vehicle of claim 1, wherein the central cooling tunnel extends from the front portion of the frame to the rear portion of the frame.

3. The off-road vehicle of claim 1, further comprising a passageway in front of the central cooling tunnel, and a fan aligned with the passageway, the fan being adapted to increase air flow through the central cooling tunnel when required.

4. The off-road vehicle of claim 1, wherein a surface area of the frontal opening is substantially equal to the surface area of an average cross-section of the central cooling tunnel.

5. The off-road vehicle of claim 1, wherein a surface area of the rear opening is substantially equal to the surface area of an average cross-section of the central cooling tunnel.

6. The off-road vehicle of claim 1, further comprising a left floor panel underneath the left seat and a right floor panel underneath the right seat, the console including a top portion and a pair of side walls extending downwardly from the top portion to the left and right floor panels.

7. The off-road vehicle of claim 6, further comprising a dashboard forward of the seats having a central section, the top portion of the console extending to the central section of the dashboard.

8. The off-road vehicle of claim 7, wherein the left and right floor panels each include a front panel rising in front of the left and right seats to reach a bottom portion of the dashboard, the front panels extending to the side walls of the console.

9. The off-road vehicle of claim 8, wherein the floor panels and the dashboard define at least in part a driver and passenger area isolated from the ground.

10. The off-road vehicle of claim 1, wherein the console further comprises at least one access panel to access the engine.

11. The off-road vehicle of claim 1, wherein the console further comprises at least one heat trap for allowing heat from the engine to reach one of the seats.

12. The off-road vehicle of claim 1, wherein the middle portion of the frame further comprises a structural cross-member generally positioned underneath the console and connecting the rear portion of the frame to the front portion of the frame.

13. The off-road vehicle of claim 1, wherein the central cooling tunnel further comprises a lower portion, the lower portion of the central cooling tunnel being closed by a skid plate.

14. An off-road vehicle comprising:
    a frame;
    at least four wheels suspended from the frame, each of the at least four wheels including a tire;
    a driver and passenger area having a left seat and a right seat mounted on the frame, floor panels including front panels extending under the left and right seats, and a dashboard disposed in front of the left and right seats, the driver and passenger area extending from the rearmost portion of the left and right seats to the front panels;
    a steering assembly disposed in the driver and passenger area forwardly of one of the seats and being operatively connected to at least two of the at least four wheels;
    an engine mounted to the frame and being operatively connected to at least two of the at least four wheels, the engine having an upper portion and a lower portion;
    a console mounted on the frame laterally between the left seat and the right seat, the console covering at least the upper portion of the engine and separating the engine from the driver and passenger area, the console having an outer side and an inner side, the inner side of the console defining a central cooling tunnel extending a majority of the length of the driver and passenger area;

the central cooling tunnel housing at least the upper portion of the engine and including a frontal opening and a rear opening allowing air flow through the central cooling tunnel.

15. The off-road vehicle of claim 14, wherein a surface area of the frontal opening is substantially equal to the surface area of an average cross section of the central cooling tunnel.

16. The off-road vehicle of claim 14, wherein the console further comprises at least one access panel to access the engine.

17. The off-road vehicle of claim 14, wherein the console further comprises at least one heat trap for allowing heat into the driver and passenger area.

18. The off-road vehicle of claim 14, wherein the console includes a top portion and a pair of side walls extending downwardly from the top portion, the side walls extending to the left and right floor panels.

19. The off-road vehicle of claim 14, wherein the central cooling tunnel further comprises a lower portion, the lower portion of the central cooling tunnel being closed by a skid plate.

20. The off-road vehicle of claim 14, further comprising a passageway in front of the central cooling tunnel, and a fan aligned with the passageway, the fan being adapted to increase air flow through the central cooling tunnel when required.

* * * * *